US012728302B2

(12) United States Patent
Bouquier et al.

(10) Patent No.: US 12,728,302 B2
(45) Date of Patent: Sep. 8, 2026

(54) ROPING HARNESS

(71) Applicant: ZEDEL, Crolles (FR)

(72) Inventors: Benoit Bouquier, Corenc (FR); Simon Emonin, Grenoble (FR)

(73) Assignee: ZEDEL, Crolles (FR)

( * ) Notice: Subject to any disclaimer, the term of this patent is extended or adjusted under 35 U.S.C. 154(b) by 263 days.

(21) Appl. No.: 18/738,444

(22) Filed: Jun. 10, 2024

(65) Prior Publication Data

US 2024/0416159 A1 Dec. 19, 2024

(30) Foreign Application Priority Data

Jun. 13, 2023 (FR) ...................................... 2305950

(51) Int. Cl.
*A62B 35/00* (2006.01)
*A62B 35/04* (2006.01)

(52) U.S. Cl.
CPC .......... *A62B 35/0025* (2013.01); *A62B 35/04* (2013.01); *A62B 35/0018* (2013.01)

(58) Field of Classification Search
CPC ............ A62B 35/0006; A62B 35/0012; A62B 35/0018; A62B 35/0025; A62B 35/0037
See application file for complete search history.

(56) References Cited

U.S. PATENT DOCUMENTS 9,168,401 B2 * 10/2015 Botti .................. A62B 35/0025
10,112,064 B2 * 10/2018 Bouquier ........... A62B 35/0025
11,826,588 B2 * 11/2023 Jain .................... A62B 35/0037
12,558,581 B2 * 2/2026 Kils ................... A62B 35/0018
2007/0256890 A1 * 11/2007 Petzl .................. A62B 35/0018 182/3
2008/0229558 A1 9/2008 Martin
2017/0216635 A1 * 8/2017 Stibilj ................ A62B 35/0018
2019/0308040 A1 10/2019 Blondeau
2020/0108294 A1 4/2020 Nance et al.
2024/0416158 A1 * 12/2024 Bouquier ........... A62B 35/0018

FOREIGN PATENT DOCUMENTS

EP 2401038 B1 12/2012
EP 2572758 A2 * 3/2013 ......... A62B 35/0025
FR 2649618 A1 1/1991
FR 2857879 A1 1/2005
WO WO-2010097824 A1 * 9/2010 ............. B64D 17/30

* cited by examiner

*Primary Examiner* — Noah Chandler Hawk
(74) *Attorney, Agent, or Firm* — Oliff PLC

(57) ABSTRACT

A roping harness includes a belt, a first and a second leg loop, and shoulder straps. The belt has an inner and an outer face. A first loop is fixed to the belt and designed for attachment of the shoulder straps. A second loop is fixed to the belt and is distinct from the first loop, the second loop being designed to form a ventral attachment point. A first strap defines a ring securely fixed to the belt and to the leg loops, the first strap being attached to the belt by a seam. The first and second loops are arranged in the ring, the first loop being outside the second loop and the second loop being outside the first loop. The first loop is arranged facing the second loop in a direction parallel to a first direction that passes through the inner and the outer face of the belt.

5 Claims, 5 Drawing Sheets

ROPING HARNESS

BACKGROUND OF THE INVENTION

The invention relates to a roping harness.

PRIOR ART

In the field of work at heights, it is known to use a roping harness provided with a belt, a pair of leg loops and shoulder straps. The roping harness has several attachment points, in particular a ventral attachment point that is designed to be attached to an attachment point, for example an anchor point or a lifeline.

The ventral attachment point can be used for performing attachment of the shoulder straps in removable manner thereby making it easier for the user to don the harness. However, the use of the same ring to perform attachment of the shoulder straps and to suspend the user by the belt impairs the ergonomics of the suspension point which complicates the rope access technician's job.

It is known to use the two webbing straps that come from the leg loops to form two rings salient from the belt. The two rings are arranged substantially inside one another to form a single loop. The two rings are passed through by the removable connector performing the connection between the shoulder straps and the belt and also by a connector designed to be fixed to the anchor point. The two connectors share the same loop which is detrimental. This configuration is widely used as it provides a high multidirectional strength for a ventral suspension point, counterbalanced however by reduced ergonomics.

It is known from the document EP2401038 to form a roping harness that has two webbing rings arranged inside one another and closed by the belt. A first webbing ring forms a first loop called inner loop and is provided with a non-removable D-shaped connector. The connector acts as ventral suspension point. A second webbing ring forms a second loop, called outer loop, that is designed for attaching the shoulder straps with the belt. The two loops are attached substantially at the same place on the belt so that the strain take-up between the shoulder straps and the ventral suspension point takes place at the same place with respect to the user's centre of gravity. The inner and outer rings are formed by the webbing straps that extend the leg loops. It is however apparent that this configuration does not procure optimal ergonomics.

In the climbing harness, a different construction is used to provide a greater freedom of movement for the user between the leg loops and the belt. The belt and leg loops pass through a ring that is located in ventral position. However, this construction is not the most suitable for working for a long time while suspended in a harness, in particular as the harness is not equipped with shoulder straps.

OBJECT OF THE INVENTION

One object of the invention consists in providing a roping harness that presents improved ergonomics of the ventral suspension point and of the shoulder straps in comparison with the prior art configurations.

This Result Tends to be Achieved by Means of a Roping Harness Comprising:

- a belt, a first leg loop, a second leg loop and a joining strap forming a leg loop link connecting the first leg loop and the second leg loop;

- a ring securely attached to the belt and passed through by the leg loop link;
- a first loop fixed to the belt to form a ventral suspension point.

The joining strap forms a first fold between a first strand extending from the first leg loop and a central portion and forms a second fold between a second strand extending from the second leg loop and the central portion.

The central portion extends mainly in a longitudinal direction of the belt from the first fold to the second fold, the central portion being fixed to the belt between the first fold and the second fold.

The ring contains the first loop, the first loop being arranged salient from the belt in the opposite direction to the first leg loop and the second leg loops.

The first fold and the second fold are arranged beyond the ring on each side of the ring in the longitudinal direction.

At least one seam fixedly secures the ring, the central part of the joining strap and the belt, the ring surrounding the belt and the central part of the joining strap.

In advantageous manner, the first fold and the second fold are secured to the belt by at least one seam.

In a particular configuration, the leg loop link is fixed to the belt by belt seams, wherein the ring is formed by a first strap having a first end fixed to a second end by resistance seams. The resistance seams withstand a first stress applied between the first loop and the leg loops and the belt seams yield to said first stress.

In an advantageous development, the first fold and/or the second fold are fixed to the belt by fold seams, wherein the ring is formed by a first strap having a first end fixed to a second end by resistance seams, and wherein the resistance seams withstand a first stress applied between the first loop, the first leg loop and the second leg loops and wherein the fold seams yield to said first stress.

In an advantageous development, the first strap is fixed to the second strap along the first loop by first loop seams and a first end of the first strap is fixed to a second end of the first strap by resistance seams. The resistance seams withstand a first stress applied between the second loop and the belt and the first loop seams yield to said first stress.

In advantageous manner, the leg loop link is made from a joining strap that presents a breaking strength in a direction connecting the first leg loop with the second leg loop that is lower than a breaking strength of the ring in a direction perpendicular to the longitudinal direction of the belt.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
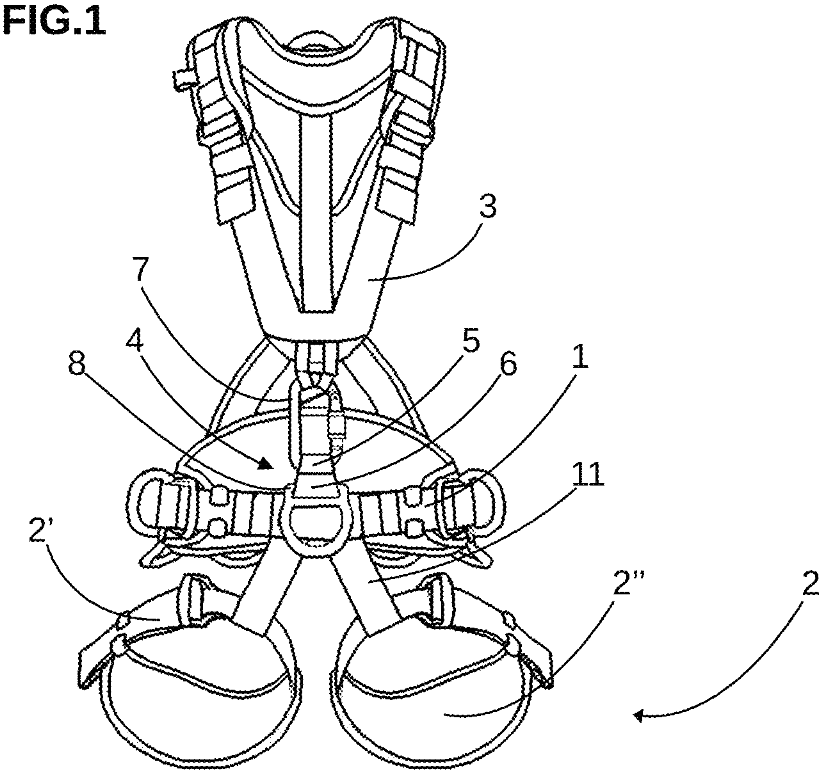
FIG. 1 illustrates a schematic view of a roping harness equipped with shoulder straps and with a ventral suspension point according to the invention.
Figure 2:
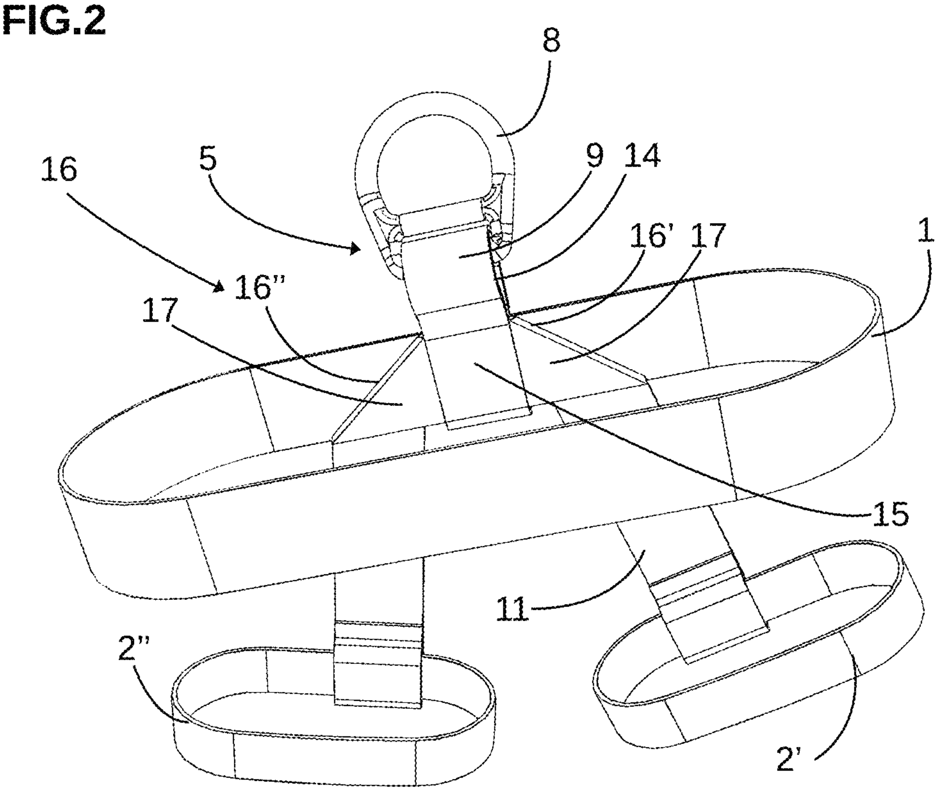
FIG. 2 illustrates a schematic view of the roping harness without shoulder straps or in which the shoulder straps have been removed.

FIGS. 1 and 2 illustrate a roping harness comprising a belt 1 and a pair of leg loops 2 with a first leg loop 2' and a second leg loop 2". The roping harness also has shoulder straps 3 one end of which is preferentially fitted removably with respect to the belt 1.

The roping harness also comprises a ventral suspension point 4 provided with a first loop 5 and a second loop 6. The first loop 5 is preferentially designed to receive the attachment of the shoulder straps 3, for example a shoulder strap connector 7. The second loop 6 is preferentially designed to be connected to an anchor point, for example a lifeline. The second loop 6 is designed to receive a wire element, a suspension connector 8 or any other component enabling the harness to be suspended.

The ventral suspension point 4 is also called navel suspension point. The ventral suspension point 4 is able to support a user installed in the harness and suspended by means of the harness. The ventral suspension point 4 is arranged in the median sagittal plane and is located close to the user's navel.

The belt 1 has a belt strap that extends in a longitudinal direction defining the circumference of the belt 1. The belt strap has a length that is greater than its width, itself greater than its thickness. The belt 1 has an inner face designed to be facing the user and preferably in contact with the latter, and an opposite outer face.

The ventral suspension point 4 has a first strap 9 fixed to the belt 1, for example by a seam, to secure the ventral suspension point 4 with the belt 1. The first strap 9 forms a ring 10 around the belt 1. In other words, the belt 1 passes through the ring 10.

The ventral suspension point 4 has a first loop 5 and a second loop 6 that are distinct from one another. The first loop 5 and the second loop 6 are installed inside the ring 10. As the first loop 5 is distinct from the second loop 6, an item fitted in the first loop 5, for example a rope or a connector, cannot move to reach the second loop 6 and vice versa.

The first loop 5 is outside the second loop 6 and the second loop 6 is outside the first loop 5. The arrangement of the two loops is different from the construction disclosed in the document EP2401038 that presents an outer loop arranged around an inner loop with two connectors arranged above one another along the rostro-caudal axis of the user. A connector placed in the inner loop can only move inside the space delineated by the outer loop and a forward movement of the inner loop tends to move the other connector fitted in the other loop which may be prejudicial.

The first loop 5 and the second loop 6 are arranged in the ring 10. The first loop 5 and the second loop 6 are different from the ring 10. Formation of a ring 10 that is passed through by the belt 1 makes it possible to have a ventral suspension point 4 that remains securely fixed to the belt 1 in case of a heavy fall. This configuration enables the constraints on the other attachments to be relaxed, in particular on the other seams where applicable.

In particularly advantageous manner, the two leg loops 2 are joined to one another by a leg loop link 11 that passes through the ring 10. In an alternative embodiment, each leg loop 2 is fixed to the belt 1 independently from the ring 10, for example by a specific seam.

In the configuration of document EP2401038, the straps coming from the leg loops form the ventral suspension point. The straps are fixed to the belt. The straps are wide and the seams are dimensioned to withstand all the fall stresses. The dimensions of the straps imply a certain stiffness. By using a ring 10 that is formed by a strap different from the leg loops 2, it is possible to reduce the width of the strap and to reduce the fixing seams between the leg loops 2 and the belt 1 thereby improving the comfort of the connection between the leg loops 2 and the belt 1.

The first loop 5 and the second loop 6 are arranged beside one another in a direction parallel to an axis passing through the outer face and the inner face of the belt 1. In other words, the first loop 5 is designed to be located between the second loop 6 and the user. In preferential manner, the first loop 5 receives the shoulder strap connector 7 performing the mechanical connection between the shoulder straps 3 and the belt 1. The shoulder strap connector 7 can be a removable connector. The second loop 6 can receive a suspension connector 8 that is preferably an irremovable connector.

The first loop 5 and the second loop 6 are installed movable with respect to one another in a direction that is parallel to a first direction passing through the inner face and the outer face at the location of the attachment between the belt 1 and the ring 10.

The first loop 5 and the second loop 6 are fitted salient from the belt 1 in a direction that extends in the direction of the shoulder straps 3, i.e. upwards when the user is standing. It is then possible to have a movement between the two loops and therefore between the two elements installed in the two loops thus improving the stress transfer on the belt 1. Movement of one loop with respect to the other takes place in a direction that passes through the outer face and the inner face of the belt 1.

In preferential manner, the first loop 5 and the second loop 6 are both fitted able to swivel with respect to the belt 1. The swivel axis of each of the two loops extends in the longitudinal direction of the belt 1.

In particularly advantageous manner, the ring 10 is attached to the belt 1 so as to freeze the position of the ventral suspension point 4 in the longitudinal direction of the belt 1 and prevent the ring 10 from rotating around the belt 1 in the longitudinal direction and perpendicularly to the longitudinal direction. Attaching the ring 10 to the belt 1 enables a better functioning of the first loops 5 and the second loop 6 to be achieved.

Figure 3:
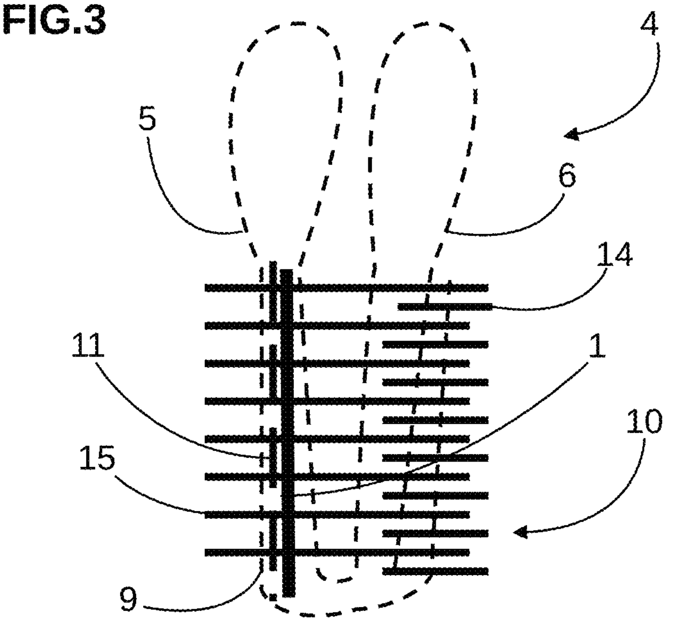
FIG. 3 illustrates a schematic view of a ventral suspension point according to the invention.

In a particular embodiment illustrated in FIG. 3, the first loop 5 and the second loop 6 are formed by a single first strap 9 the two ends of which are attached to one another to form the ring 10 and that is shaped to define the first loop 5 and the second loop 6.

In advantageous manner illustrated in FIGS. 4 to 8 and 10, the first strap 9 and a second strap 12 are used to form the first loop 5 and the second loop 6. The first strap 9 forms a ring 10 that surrounds the belt 1. The second strap 12 is arranged in the ring 10 to divide the ring 10 into the first loop 5 and the second loop 6.

The first strap 9 is distinct from the strap that forms the first leg loop 2' and distinct from the strap that forms the second leg loop 2". The same is the case for the second strap 12. The second strap 12 is fixed to the first strap 9, preferably by a seam to define the two loops.

The second strap 12 separates the first loop 5 and the second loop 6. It is advantageous for the first strap 9 and the second strap 12 to be fixed to the belt 1. The second strap 12 is installed inside the ring 10 so as to separate two spaces that form the first loop 5 and the second loop 6.

The first loop 5 is not situated inside the second loop 6 and vice versa. Preferentially, each loop has a first end fixed to the belt 1 to facilitate the strain take-up on the belt 1. More preferentially, each loop has a second end fixed to the belt 1. Each of the loops is distinct from the other so that an item placed in the first loop 5 cannot move to the second loop 6 and vice versa.

The first loop 5 and the second loop 6 are arranged salient from the belt 1 in the direction of the shoulder straps 3.

In preferential manner, the closure of the ring 10 by seams joining the two opposite ends of the first strap 9 is different from the seams performing attachment to the belt 1 so as to make the seams that close the ring 10 and the seams that attach the ring 10 to the belt 1 work differently.

In preferential manner, the two ends of the first strap 9 that are fixed to one another to close the ring 10 form all or part of the first loop 5 or of the second loop 6 and more preferentially at least a part of the second loop 6. Doubling the thickness increases the stiffness of the loop to make the latter easier to handle.

It is advantageous for the overlap length between the two ends of the first strap 9 to represent at least 30% of the length of the second loop 6, preferably the distance that separates the two attachment points to the belt 1. More preferentially, the overlap length represents at least 50% of the length of the second loop 6, or even more than 70% of the length of the second loop 6.

It is particularly advantageous for the second strap 12 to form the curved part of the second loop 6, i.e. the part that is designed to receive the shoulder strap connector 7. The second strap 12 prevents wear of the first strap 9. It is preferable for the second strap 12 to have a single end fixed directly to the belt 1. What is meant by attached directly to the belt is attachment where a part of the second strap 12 is installed in fixed manner with respect to a part of the belt 1. The second strap 12 can be in direct contact with the belt 1 or separated for example by the leg loop link 11. Securing is preferentially obtained by a stitched seam, where the stitching thread passes through the second strap 12 and the belt 1 and can pass through the leg loop link 11 and preferentially the first strap 9. By fixing only one end of the second strap 12 with the belt 1, it is ensured that a stress is applied on the first strap 9 and on the belt 1 when the connector seeks to move away from the belt 1. This also facilitates formation of the second loop 6. The stitching operation, if applicable, is also made easier.

In preferential manner, the overlap area between the two ends of the first strap 9 has attachments, for example the resistance seams 14, that extend in continuous or almost continuous manner over the whole overlap length to prevent installation of a connector or a wire element between the two strands of the first strap 9 thus preventing formation of an additional loop.

It is also advantageous for the attachment between the belt 1 and the first strap 9 and the attachment between the belt 1 and the second strap 12 to extend in continuous or almost continuous manner to prevent installation of a connector or a wire element between the belt 1 and each of the first strap 9 and the second strap 12 thus preventing formation of an additional loop.

It is also advantageous for the attachment between the second strap 12 and the first strap 9, for example by means of first loop seams 13, to extend in continuous or almost continuous manner to prevent installation of a connector or a wire element between the first strap 9 and the second strap 12 thus preventing formation of an additional loop.

These configurations prevent the attachments from working in disadvantageous mode, notably in peel-off when the attachment is a seam, in particular when the ventral suspension point 4 is subjected to large stresses.

In case the attachment between the first strap 9 and the second strap 12 yields, the connector or connectors and/or wire elements installed in the first loop 5 and/or in the second loop 6 remain securely fixed to the ring 10 and therefore remain securely fixed to the belt 1. The same applies in case the attachment between the belt 1 and the first strap 9 breaks.

This construction is advantageous, as the securing of different elements with the belt 1 is preserved by means of the ring 10. It is therefore possible to reduce the size of the ventral suspension point 4 choosing a ring 10 presenting mechanical performances chosen to withstand a predefined set of stresses. This makes it possible for example to choose the thickness, width, material and configuration of the attachments that close the ring 10 on the first strap 9.

The attachments between the belt 1 and the first strap 9, the attachments between the belt 1 and the second strap 12 and the attachments between the first strap 9 and the second strap 12 can be chosen with less performances. It is also possible to choose a second strap 12 with less performances than the first strap 9.

In a preferred embodiment, the first loop 5 receives the attachment of the shoulder straps 3 and the second loop 6 receives the attachment to the anchor point, for example a lifeline. The first loop 5 is at least partly covered by the second strap 12. More preferentially, the attachment between the first strap 9 and the second strap 12 is obtained by a stitched seam.

When a stress is applied between the first loop 5 and the second loop 6, the first loop seams 13 between the first strap 9 and the second strap 12 along the first loop 5 work in peel-off. It is advantageous to configure these first loop seams 13 to yield when subjected to a first threshold stress that is equal to a maximum tolerated stress above which the suspension point can no longer be used and that is lower than a stress causing breaking of the ring 10. In other words, the first strap 9 is fixed to the second strap 12 along the first loop 5 by first loop seams 13 and a first end of the first strap 9 is fixed to a second end of the first strap 9 by the resistance seams 14. The resistance seams 14 resist a first stress applied between the second loop 6 and the belt 1 and the first loop seams 13 yield to said first stress.

Consequently, on observing that the seam threads forming the link between the first strap 9 and the second strap 12 along the first loop 5 are broken, the user detects that the harness is no longer usable. The seam threads act as indications that a greater stress than the maximum authorised stress has been applied.

The same can be the case for the seam threads that form the attachment between the ring 10 and the belt 1. For example, the first strap 9 is fixed to the belt 1 by belt seams 15 and a first end of the first strap 9 is fixed to a second end of the first strap 9 by resistance seams 14. The resistance seams 14 resist a first stress applied between the second loop 6 and the belt 1 and the belt seams 15 yield to said first stress. The same can be the case when the belt seams 15 secure the belt 1 and the first strap 9 to one another, or secure the belt 1 and the second strap 12 to one another, or secure the belt 1, the first strap 9 and the second strap 12 to one another.

Figure 4:
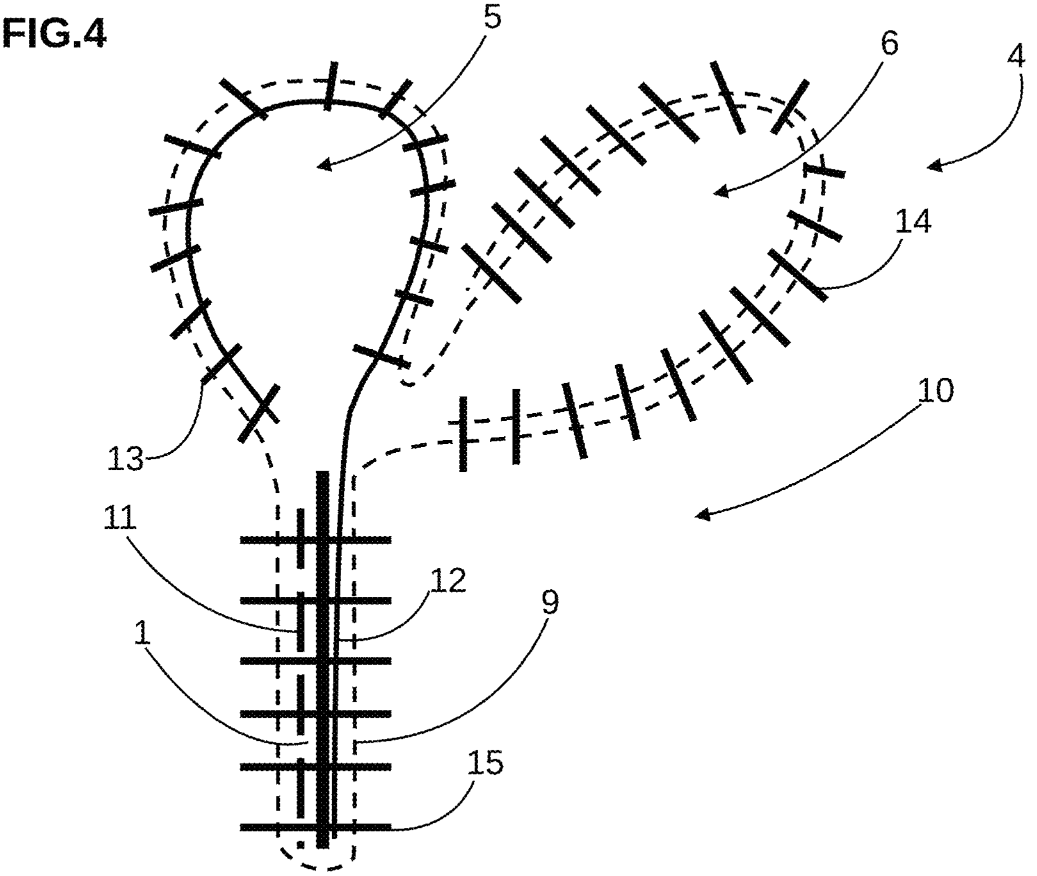
FIG. 4 illustrates another schematic view of a ventral suspension point according to the invention.
Figure 5:
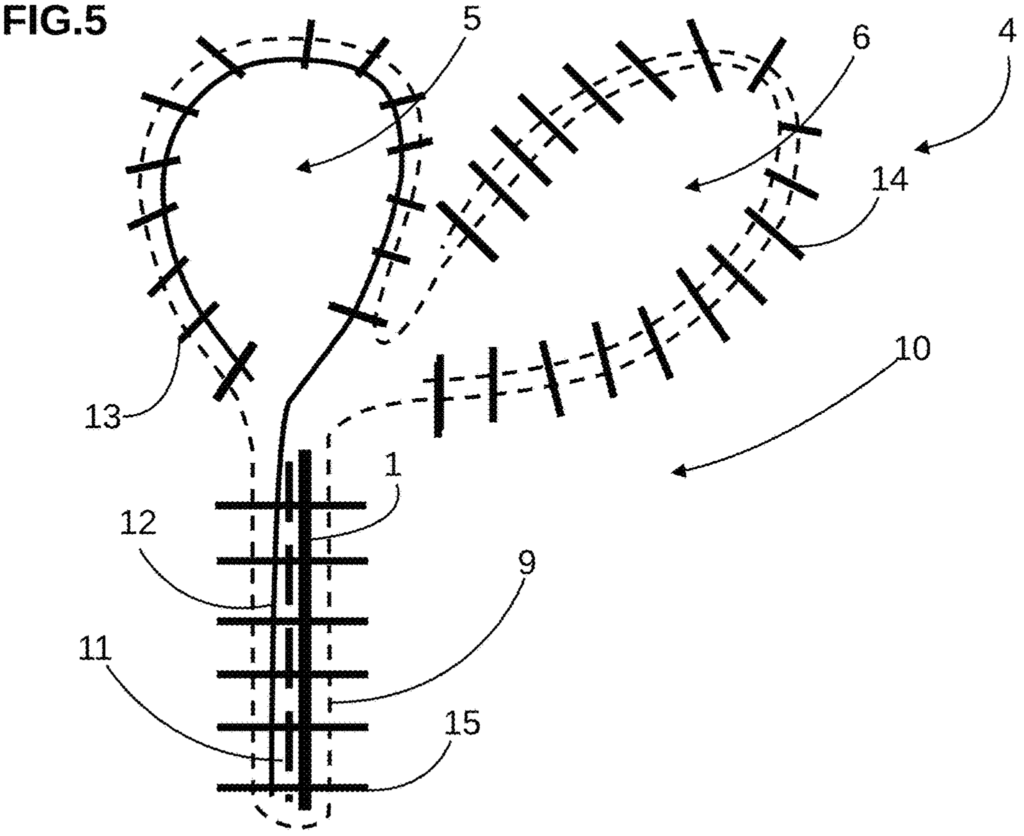
FIG. 5 illustrates yet another schematic view of a ventral suspension point according to the invention.

In the embodiment of FIG. 4, the second strap 12 is arranged against the outer face of the belt 1, but a very similar operation can be obtained by placing the second strap 12 against the inner face of the belt 1 as illustrated in FIG. 5. Placing the second strap 12 on one side or the other of the belt 1 only modifies the mechanical performances of the ventral suspension point 4 very slightly. Attaching the second strap 12 to the belt 1 on the other hand ensures a better strain take-up by the belt 1 in comparison with a second strap 12 attached to the second loop 6 to close the second loop 6.

In an alternative embodiment, the second strap 12 has a lower elongation at break than that of the attachments. If a large stress is applied, the second strap 12 breaks in the separating area between the first loop 5 and the second loop 6. Observation of breaking of the second strap 12 is an indicator of a stress higher than a threshold value.

It is advantageous to form the second loop 6 by means of the two ends of the first strap 9, as in case a violent stress is applied, for example in case of a fall, the attachments between the two ends work in a more advantageous mode thereby enabling a better breaking strength to be had.

Figure 6:
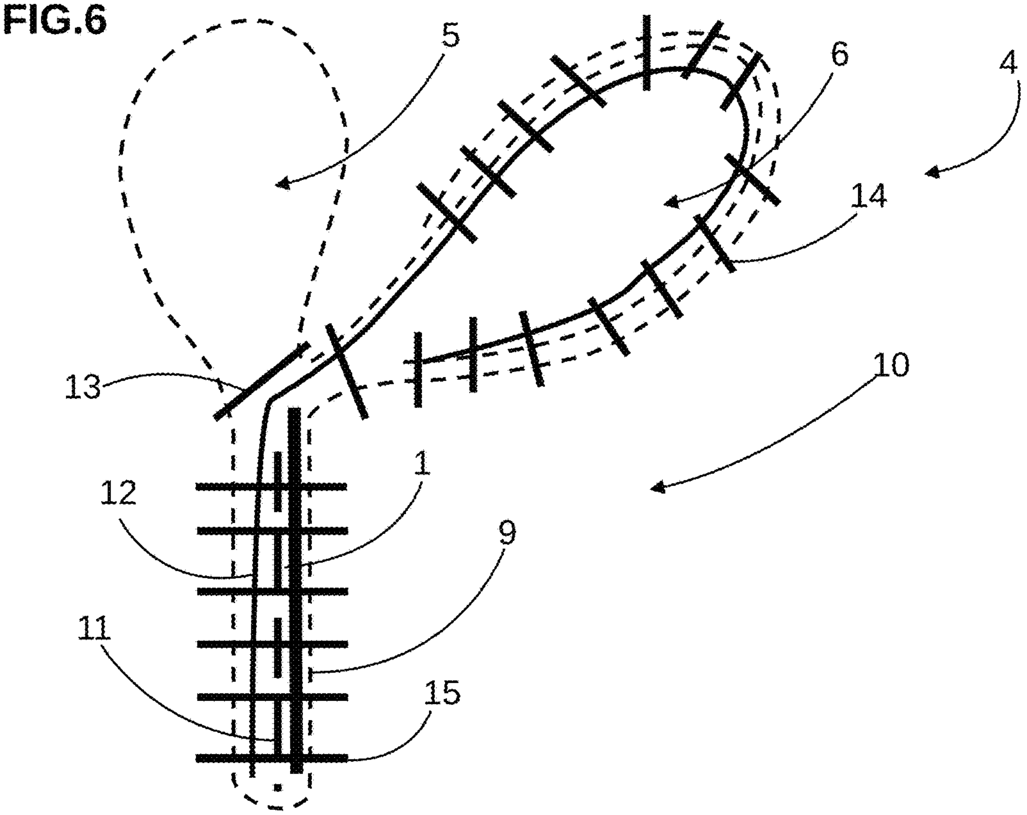
FIG. 6 illustrates a schematic view of a fourth embodiment of a ventral suspension point.
Figure 7:
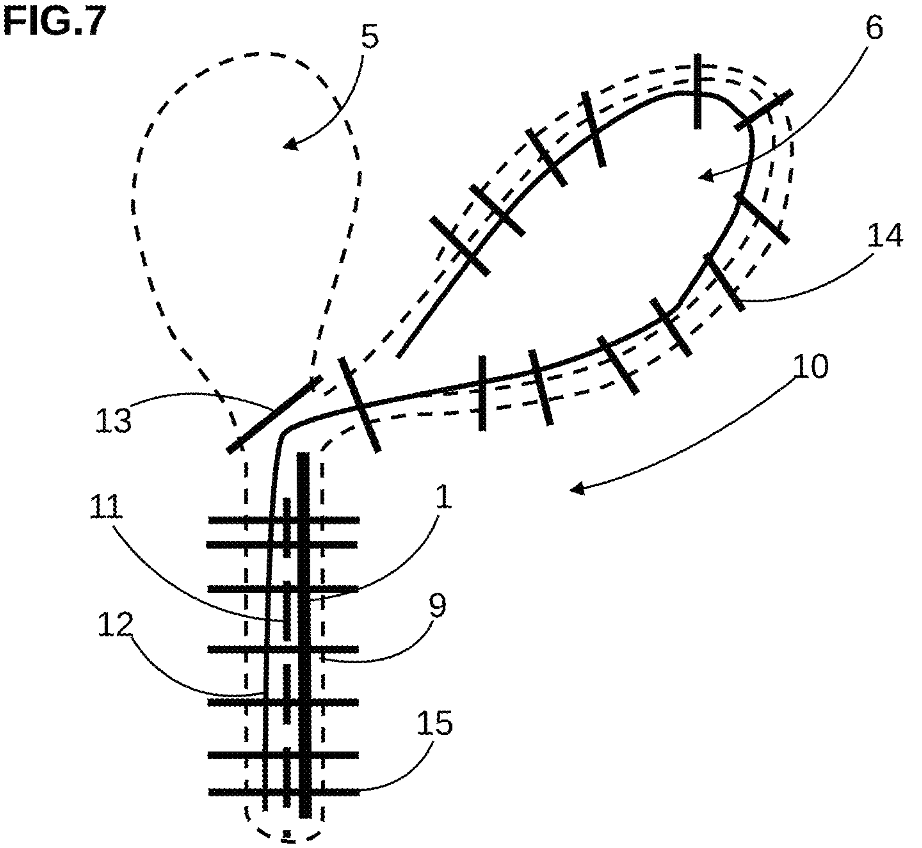
FIG. 7 illustrates a schematic view of a fifth embodiment of a ventral suspension point.

In the embodiment illustrated in FIGS. 6 and 7, the second strap 12 is arranged in the second loop 6. The first loop 5 can be closed by a first loop seam 13 to act as indicator that yields when the suspension point is subjected to a large stress. It is also possible to have breaking of the second strap 12. However, this embodiment is less advantageous than that of FIGS. 4 and 5 as monitoring of the breaking stresses of the indicators is more difficult to achieve. There again, the second strap 12 can be located on one side or the other of the belt 1.

Figure 8:
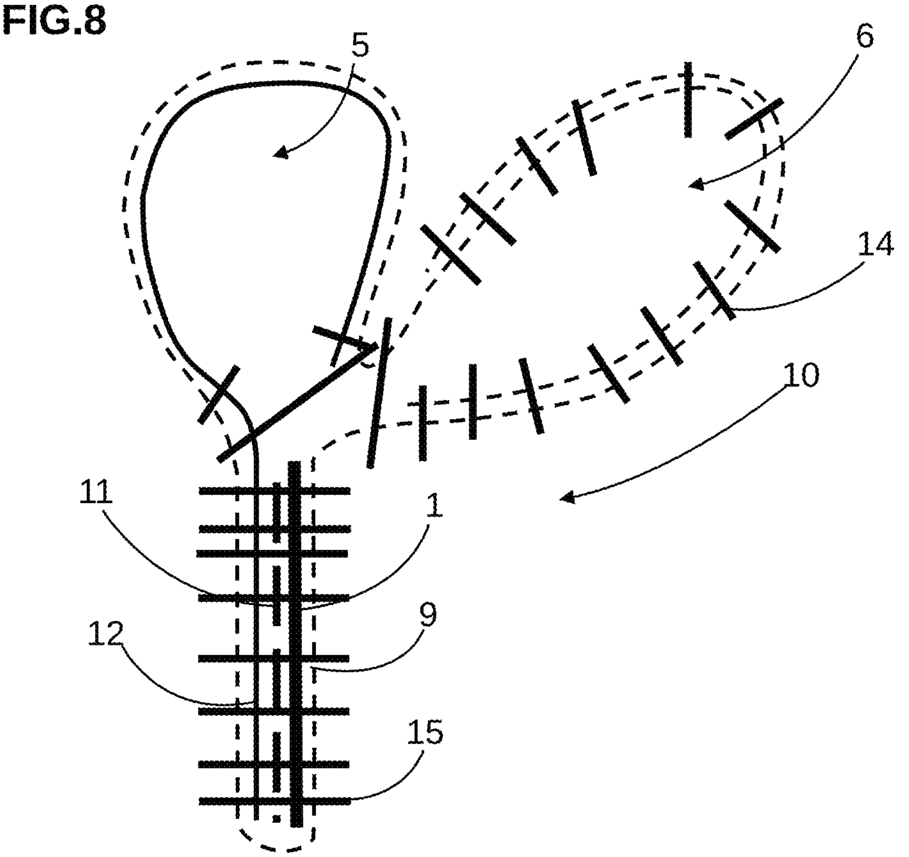
FIG. 8 illustrates a schematic view of a sixth embodiment of a ventral suspension point.

FIGS. 7 and 8 illustrate embodiments where the second strap 12 is used and where the second strap does not perform separation between the two loops. This embodiment is less advantageous than the previous embodiments due to the fact that closing of the loops is performed by at least one seam, preferably by a seam at the end of each loop. This embodiment is less advantageous as separation between the loops is less well mastered in time on account of the stresses applied on the seams being high.

The first strap 9 forms a ring 10 that surrounds the belt 1. Preferentially, the leg loop link 11 passes through the ring 10. More preferentially, the leg loop link 11 is fixed to the belt 1 with the same seam as the first strap 9 and possibly as the second strap 12.

Preferentially, the first loop 5 and the second loop 6 are arranged facing one another in a direction that is perpendicular to the outer face of the belt 1. The two loops are pass-through in the longitudinal direction of the belt 1.

The use of a leg loop link 11 that connects the two leg loops 2 and passes through the ring 10 is particularly advantageous as it provides the mechanical connection between the leg loops 2 and the belt 1 while relaxing the technological constraints on the attachment between the leg loops 2 and the belt 1.

Figure 9:
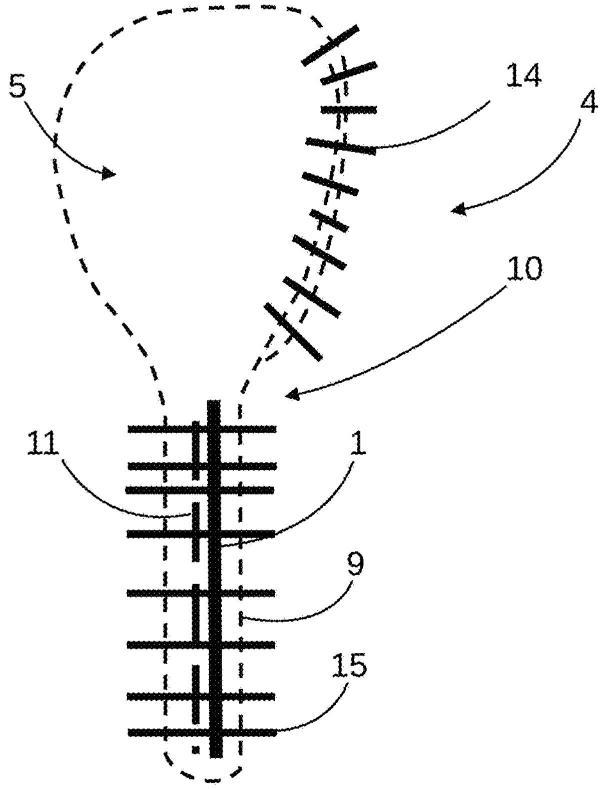
FIG. 9 illustrates a schematic view of a seventh embodiment of a ventral suspension point.

The ventral suspension point 4 can have a first loop 5 and a second loop 6. However, as an alternative, it is possible for the suspension point to have only the first loop 5 or only the second loop 6 as illustrated in FIG. 9.

Figure 10:
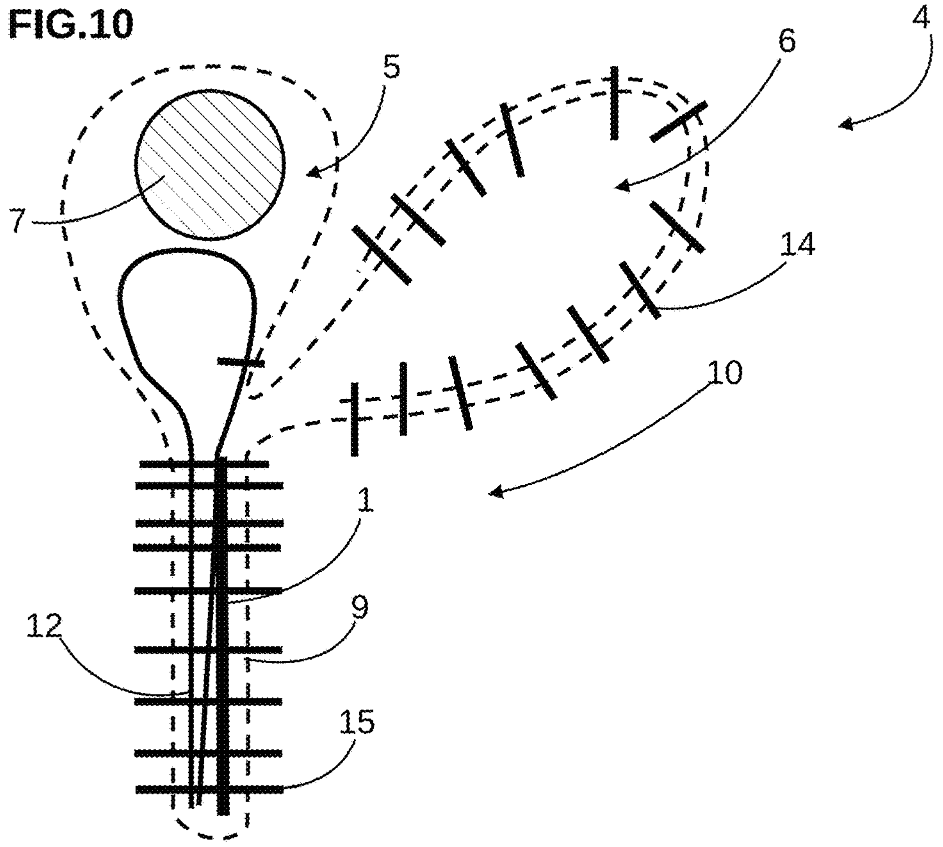
FIG. 10 illustrates a schematic view of an eighth embodiment of a ventral suspension point.

In the embodiment illustrated in FIG. 10, the ventral suspension point 4 defines three loops with an additional loop that is located in the first loop 5. The additional loop is formed by the second strap 12 and preferentially uses the portion of the second strap 12 that separates the first loop 5 and the second loop 6. In preferential manner, the shoulder strap connector 7 is installed in the first loop 5 outside the additional loop. More preferentially, the shoulder strap connector 7 is removable from the first loop 5. The shoulder strap connector 7 forms the connecting link between the shoulder straps 3 and the belt 1.

It is advantageous for one or more removable connectors to be installed in the additional loop. The second loop 6 is used to attach the harness to an anchor point.

In professional harnesses designed for work at heights, it is commonplace to have a ventral suspension point that is located facing the user's navel. This configuration makes it easier to install the different items of equipment that will be used during the lengthy suspension phases. This explains why the configuration of a harness designed for working at heights is different from that of a climbing harness that is more commonly called "sport harness".

In the configurations of harnesses for work at heights of the prior art, the webbing straps forming the leg loop links are fixed to the belt and form the loop or loops that delineate the ventral suspension point. Consequently, the performances of the leg loop straps are chosen such as to withstand the stresses of a ventral suspension point.

It is conventional to use a wide strap to form the loop of the ventral suspension point and the strap is extended up to the two leg loops. To provide the strength in case of a fall, it is necessary to stitch seams over a large surface between each of the webbing strands and the belt. The prior art configuration implies having a large incline of the leg loop links from the ventral suspension point 4 up to the leg loops 2. Such a configuration limits user comfort at the level of the thighs, in particular when the user is suspended by means of the harness.

To improve user comfort around the ventral suspension point 4 without making the roping harness too complicated to manufacture, it is advantageous to use a joining strap that joins the first leg loop with the second leg loop. The joining strap passes through the ring 10 so that the joining strap always remains securely attached to the belt 1 by means of the ring 10.

The joining strap defines folds 16 with a first fold 16' between the central part of the joining strap and a first strand that extends from the first leg loop 2'. The joining strap defines a second fold 16" between the central part of the joining strap and a second strand that extends from the second leg loop. The first fold is separated from the second fold by the ring 10. The two strands are attached to the belt 1 with a larger separating distance than the prior art configurations.

In preferential manner, the first fold and second fold are securely attached to the belt 1 by at least one seam. Advantageously, the central portion of the joining strap is securely attached to the belt 1 so that the belt 1 and the central portion deform in the same way in the longitudinal direction of the belt 1 and in the transverse direction of the belt 1.

The first fold 16' and the second fold 16" are separated by the ring in the longitudinal direction of the belt 1.

In preferential manner, the first fold 16' and/or the second fold 16" are attached to the belt 1 by fold seams 17. The ring 10 is formed by a first strap 9 a first end of which is attached to a second end by resistance seams 14. The resistance seams 14 withstand a first stress applied between the first loop 5 and the leg loops 2 and the fold seams 17 yield to said first stress.

Advantageously, the leg loop link 11 is attached to the belt 1 by the belt seams 15. The ring 10 is formed by a first strap 9 a first end of which is attached to a second end by the resistance seams 14. The resistance seams 14 withstand a first stress applied between the first loop 5 and the leg loops 2 and the belt seams 15 yield to said first stress.

The use of a belt seam 15 and/or a fold seam 17 that are less strong than the resistance seam 14 provides an indicator of a violent stress on the harness. The first stress can represent the maximum stress authorised for the harness. When the harness is subjected to a higher stress than a threshold value, the fold seam 17 and/or the belt seam 15 yield. The seams that yielded act as indicator.

Installation of the leg loop link 11 inside the ring 10 and dissociation between the leg loop link 11 and the loop designed to be attached to the anchor point enable the mechanical behaviour of the straps forming the link between the leg loops 2 and the ventral suspension point 4 to be modified. The wider first strap 9 forming ring is, the more possible it is to have a large strength of the ventral suspension point 4, the others parameters being unchanged. However, this makes the loop less practical to use and limits the user comfort of the leg loop links when the strap extends up to the leg loops 2.

To form the leg loop link 11, it is advantageous to use a less wide strap than the prior art straps thereby improving the comfort of the leg loop link. In particular, it is advantageous to use a strap that is less wide and/or less thick than the strap that forms the belt 1. It is further possible to use a strap that is more flexible which generally corresponds to a strap having a lower elongation at break if the other parameters, in particular the cost, are not to be adversely affected.

In preferential manner, between the first fold 16' and the second fold 16", the leg loop link 11 extends mainly or solely in the longitudinal direction of the belt 1 and the leg loop link 11 is securely attached to the belt 1. The leg loop link 11 and the belt 1 deform in similar manner resulting in a more homogeneous mechanical functioning between leg loop links 11 and the belt 1.

The invention claimed is:

1. Roping harness comprising:

a belt, a first leg loop, a second leg loop;

a joining strap forming a leg loop link connecting the first leg loop and the second leg loop, the joining strap having a central portion disposed between a first end connected to the first leg loop and a second end connected to the second leg loop;

a first loop fixed to the belt to form a ventral suspension point; and a ring securely attached to the belt, the leg loop link passing through the ring, the first loop being disposed in the ring, the ring surrounding the belt and the central portion of the joining strap;

wherein the joining strap forms a first fold between the central portion and the first end and forms a second fold between the central portion and the second end; the first fold and the second fold being arranged beyond the ring on each side of the ring in the longitudinal direction;

wherein the central portion extends mainly in a longitudinal direction of the belt from the first fold to the second fold, the longitudinal direction connecting the first end to the second end;

wherein the first loop is arranged salient from the belt in a first direction and the first leg loop and the second leg loop are arranged salient from the belt in a second direction opposite to the first direction;

wherein the central portion is fixed to the belt between the first fold and the second fold; and wherein at least one seam fixedly secures the ring, the central portion of the joining strap and the belt.

2. Roping harness according to claim 1 wherein the first fold and the second fold are secured to the belt by at least one additional seam.

3. Roping harness according to claim 1 wherein the leg loop link is fixed to the belt by belt seams, wherein the ring is formed by a first strap having a first end fixed to a second end by resistance seams, wherein the resistance seams withstand a first stress applied between the first loop and the leg loops and wherein the belt seams yield to said first stress.

4. Roping harness according to claim 1 wherein the first fold or the second fold is fixed to the belt by fold seams, wherein the ring is formed by a first strap having a first end fixed to a second end by resistance seams, and wherein the resistance seams withstand a first stress applied between the first loop, the first leg loop and the second leg loops and wherein the fold seams yield to said first stress.

5. Roping harness according to claim 1 wherein the leg loop link is made from a joining strap that presents a breaking strength in a direction connecting the first leg loop with the second leg loop that is lower than a breaking strength of the ring in a direction perpendicular to the longitudinal direction of the belt.

* * * * *